June 24, 1924.

H. P. SIDELINGER 1,498,815

BRAKE FOR VEHICLES

Filed May 17, 1923

2 Sheets-Sheet 1

WITNESSES

INVENTOR
H. P. Sidelinger,
BY
ATTORNEYS

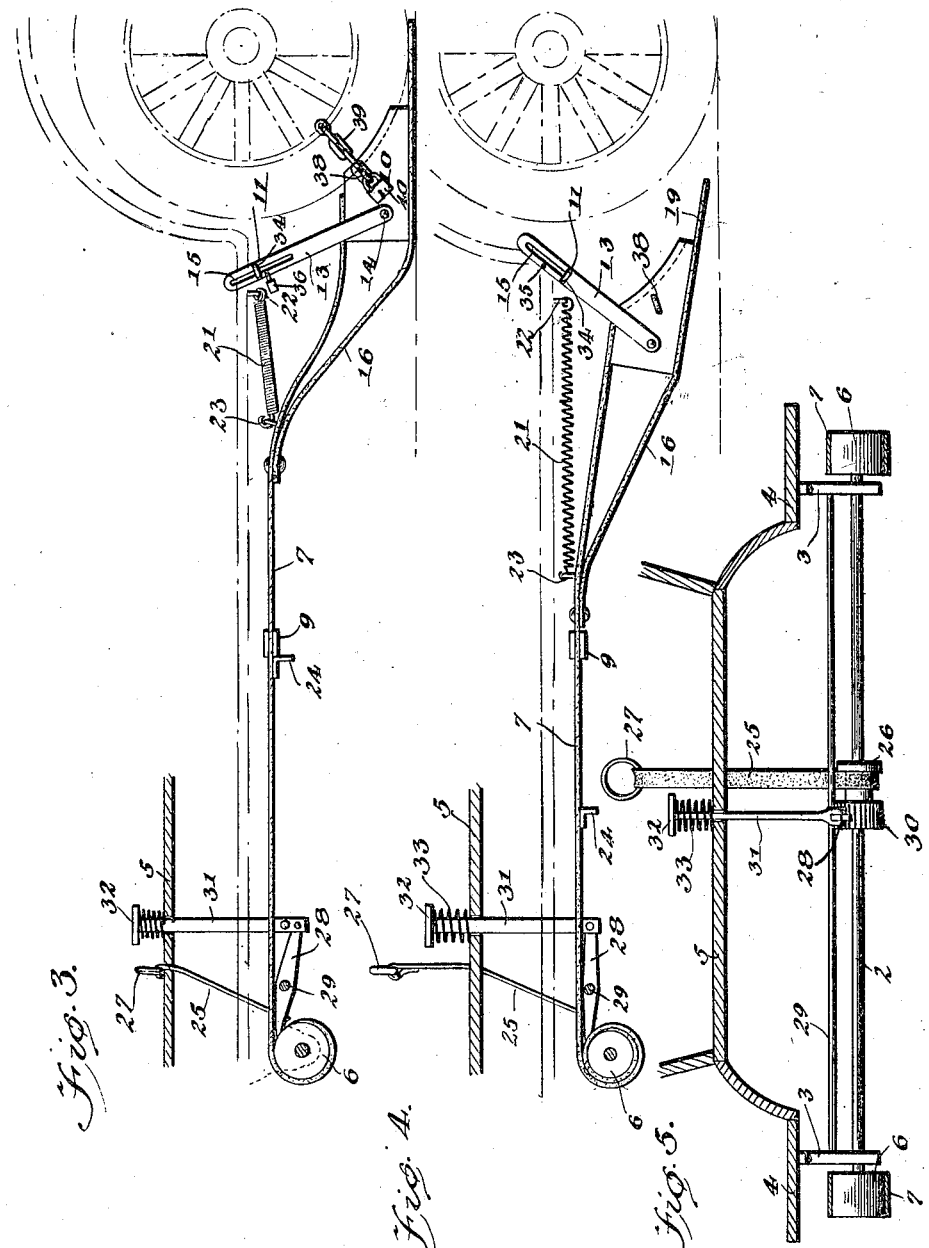
June 24, 1924.
H. P. SIDELINGER
BRAKE FOR VEHICLES
Filed May 17, 1923
1,498,815
2 Sheets-Sheet 2
WITNESSES
INVENTOR
H. P. Sidelinger,
BY
ATTORNEYS Patented June 24, 1924.

1,498,815

UNITED STATES PATENT OFFICE.

HENRY PERKINS SIDELINGER, OF BASIC, VIRGINIA.

BRAKE FOR VEHICLES.

Application filed May 17, 1923. Serial No. 639,712.

*To all whom it may concern:*

Be it known that I, HENRY P. SIDELINGER, a citizen of the United States, and a resident of Basic, in the county of Augusta and State of Virginia, have invented certain new and useful Improvements in Brakes for Vehicles, of which the following is a specification.

My invention relates generally to improvements in brakes, more particularly to improvements in brakes for automotive vehicles, and it consists in the combinations, constructions and arrangements herein described and claimed.

An object of the invention is to provide a brake of simplified construction which is adapted to be applied to an automobile and to then afford facilities operable by the driver of the automobile to cause the latter to be brought to a sudden stop.

A further object of the invention is to provide a brake of the character described which is strong and durable, not likely to get out of order, and thoroughly practical commercially.

Other objects and advantages will be apparent from the following description, considered in conjunction with the accompanying drawings, in which:—

Figure 1:
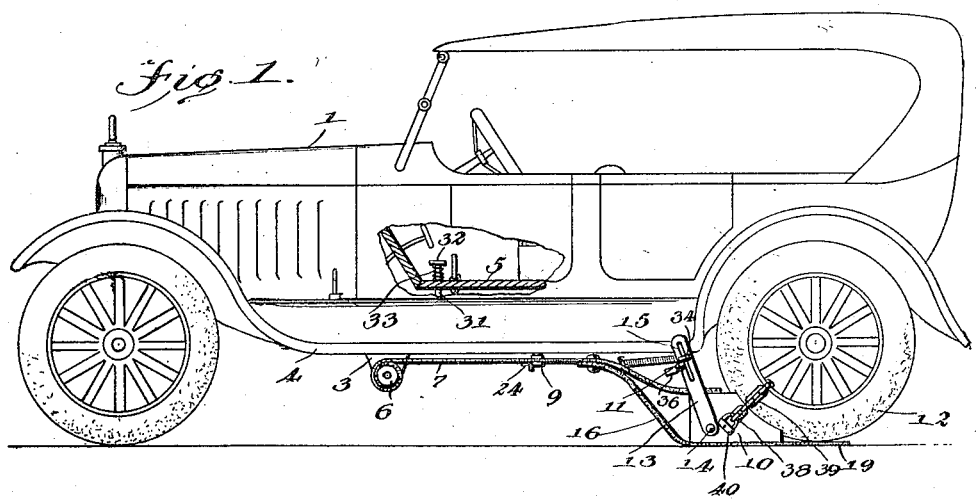
Figure 2:
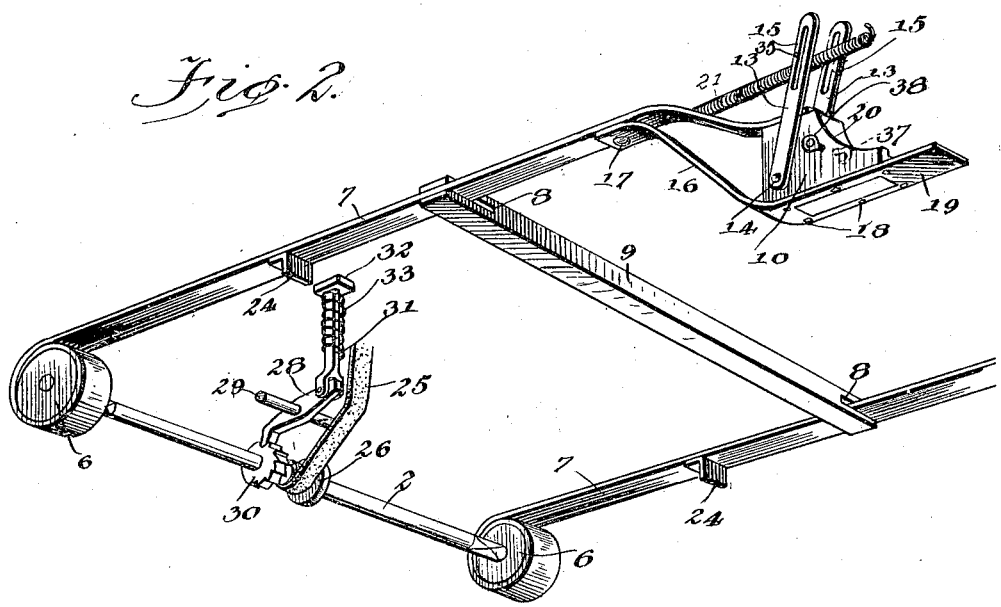

Fig. 1 is a side elevation of an automobile equipped with a brake embodying the invention, portions of the body of the automobile being broken away to show parts which would otherwise be undisclosed, Fig. 2 is a fragmentary perspective view showing the brake detached, Fig. 3 is a longitudinal vertical section through the brake construction and through a portion of the floor-board of the automobile, showing a brake shoe comprised in the device in braking relation to one of the traction wheels of the automobile, Fig. 4 is a view similar to Fig. 3, showing the brake shoe in the position in which held out of contact with the automobile wheel, and Fig. 5 is a transverse vertical section through the brake construction and through a portion of the automobile body.

Referring now to the drawings, I show in Fig. 1, an automobile which is designated in Fig. 1 at 1 and which may be of any preferred known type of construction. The automobile 1 is provided with the usual brake mechanism for checking the speed thereof, when desired. As is well known, the usual brake mechanism of automobiles may be ineffective to bring the automobile to a sudden stop when the surface being traversed by the automobile is covered with ice or is slippery for any other cause. In such cases, the automobile will slide on the surface after the traction wheels thereof have been brought to a stop by the usual brake mechanism.

My invention provides brake means designed primarily, although not necessarily, for use in an emergency and particularly when the surface which is being traversed by the automobile to which the device is applied, is slippery.

In carrying out my invention, I provide a shaft 2 which is arranged to extend transversely of the automobile body in underlying relation thereto and almost directly beneath the driver's feet, the shaft being journalled in bracket arms or lugs 3 depending from the body of the automobile. In the present instance, the depending bracket arms 3 are shown as being attached to the under sides of the running boards 4 which of course extend along opposite sides of the body of the automobile and are connected with the floor boards 5 which are comprised in the automobile body. A drum 6 is secured to the shaft 2 at each end of the latter. A flexible connector 7 which may be a length of relatively narrow belting or elongated strip of relatively heavy fabric, such as canvas, is secured at one end to the periphery of each of the drums 6 and extends rearwardly in underlying relation to one of the running boards. The flexible connector 7 is adapted to be wound on one of the drums 6 when the shaft 2 is rotated in one direction and to be unwound from the drums when the shaft 2 is rotated in the opposite direction. Each flexible connector 7 is supported intermediate its length in a horizontal guide slot 8 formed in the adjacent end of a cross bar 9 which is secured to the under side of the vehicle body in parallel relation to the shaft 2. Each flexible connector is attached at its rearward end to the upper side of a brake shoe 10 which is swingingly suspended from horizontal studs or bolts 11 carried by the vehicle body in adjacent relation to each of the rear or traction wheels 12 of the automobile by means of a pair of links 13, each of the links 13 being pivotally connected at its lower end to the brake shoe at one side of the latter and having adjacent to its upper end an elongated opening or slot 15 in which one of the studs 11 is received. The arrangement is such that the brake shoes 10 may move vertically during their swinging movement about a horizontal axis.

An auxiliary connecting strip 16 is provided for each of the connecting strips 7 and is attached at its forward end to the latter at an appreciable distance forwardly of the brake shoes, as indicated at 17, being then secured to the under side of the brake shoe 10, as indicated at 18, and terminating at its rearward end rearwardly of the brake shoe, thus providing a trailer portion 19 for a purpose to be hereinafter described. Each of the brake shoes 10 comprises a block having the upper portion of the rearward face thereof curved as indicated at 20 to conform to the curvature of the periphery of the wheel 12. A retractile spring 21 secured at its rearward end to a fastening element 22, which depends from the body of the automobile in advance of the studs 11 but in adjacent relation thereto, is connected at its forward end, as at 23, to the flexible connector 7 at a point adjacent to the juncture of the latter with the auxiliary connector 16. The retractile spring 21 tends to move the flexible connector 7 rearwardly in the direction of its length until a stop 24 carried by the flexible connector engages with the cross bar 9 and prevents further rearward movement of the flexible connector. At this time, the brake shoe 10 has been swung rearwardly and is permitted to move downwardly until it has been forced against the periphery of the adjacent wheels 12 and is resting at the same time upon the surface which is being traversed, the trailer portion 19 extending rearwardly beneath the periphery of the wheel 12 so that the latter no longer engages with the ground or like surface.

The brake shoes 10 normally are held out of engagement with the traction wheels 12 and the springs 21 are placed under tension by means which will now be described. Such means include a flexible shaft operating element 25 which may be a strap or other cable and which, after being wound several times about a drum 26 secured to the shaft 2, is secured at its lower end to the drum 26 and is then extended upwardly through an opening in the floor-board 5, being provided at its upper end with a ring or loop 27 which is adapted to be grasped conveniently by the driver of the vehicle so that an upward pull may be exerted on the element 25. The arrangement is such that when the shaft operating element 25 is pulled upwardly, the shaft 2 will be rotated in the direction which will result in the connectors 7 being moved forwardly and the brake shoes 10 will be moved from the position indicated in Fig. 3 to the position indicated in Fig. 4 while the springs 21 will be placed under tension. When the shaft operating element 25 is released after having been pulled upwardly, rotation of the shaft 2 in response to the action of the springs 21, will be prevented because of the engagement of a pawl 28 which is pivoted intermediate its length on a support 29 carried by the automobile body in position to engage at its forward end with the teeth of a ratchet wheel 30 which is secured to the shaft 2. A pawl operating rod 31 is pivotally attached at its lower end to the pawl 28 at the rearward end of the latter and extends upwardly through an opening in the floor-board of the automobile body, being provided at its upper end with a foot plate or pedal 32 and being urged upwardly continuously by an expansion spring 33 which is arranged between the foot plate 32 and the floor board 5.

From the foregoing description of the various parts of the device, the operation thereof may be readily understood. After the shaft operating element 25 has been manipulated in the manner described to cause the brake shoes 10 to be swung forwardly and upwardly and to place the springs 21 under tension, the brake shoes will be held out of engagement with the wheels 12 until the shaft 2 is released from the pawl 28. This is accomplished by pressing the pawl operating rod 31 against the action of the spring 33, whereupon the pawl 28 will be rotated about the axis of the support 29 until the forward end of the pawl disengages the ratchet wheel 30 and the shaft 2 will then be free to rotate in response to the actuation of the springs 21 thereon through the flexible connector 7. The brake shoes 10 and trailers 19 will then be swung downwardly and rearwardly into engagement with the traction wheels of the automobile, as illustrated in Figures 1 and 3 and the traction wheels will no longer engage with the surface which is being traversed. In consequence, the automobile will be brought to a sudden stop.

It is desirable that the invention shall provide means functioning to prevent operation by unauthorized persons of an automobile equipped with the invention. To this end, the outwardly extending studs or bolts 11 have relatively wide heads 34 extending laterally of the sides of the slots 15 which extend longitudinally in the outermost links 13, as hereinbefore described. Each of the outermost links 13 is provided with an opening 35 located in the path of a lateral portion of the head of one of the studs or bolts and receiving the shackle of a padlock 36 which may be any suitable known construction. The location of the opening 35 in each of the outermost links 13 in respect to the ends of the slot 15 in the link is such that when the shackle of the padlock has been inserted through the opening 35 after the brake shoe 10 connected with such link 13 has been swung into position to frictionally engage the periphery of one of the wheels 12, the shackle of the padlock will engage with the lower side of the head of one of the bolts 11 and will thus prevent such relative movement of the bolt 11 and the link 13 as would be required to permit movement of the brake shoe out of braking engagement with the wheel 12. In consequence, theft or unauthorized use of an automobile equipped with an embodiment of the invention in the form in which it is described in the foregoing is practically prevented.

To further safeguard an automobile equipped with the invention against theft, I may provide a hook or eye bolt 37 on the inner side of each of the brake shoes 10 while an eye bolt 38 is provided on the outer side of the brake shoe. A chain 39 attached releasably or permanently to the hook or eyebolt 37 is adapted to be passed across the inner peripheral wall of the felloe of one of the wheels 12, drawn taut and then engaged with the eye bolt 38 on the outer side of the brake shoe. The shackle of a padlock 40 is then engaged with the chain and with the eyebolt 38 to prevent disengagement of the chain from the latter, whereby the wheel 12 will be held against rotation and theft or unauthorized use of the automobile thus precluded.

Obviously, my invention is susceptible of embodiment in forms other than that illustrated in the accompanying drawing, and I therefore consider as my own all modifications and adaptations of the form of the device herein described which fairly fall within the scope of the appended claims.

I claim:—

1. In a brake construction for automotive vehicles, a brake shoe, means for supporting the brake shoe on the body of the vehicle for movement to and from position to frictionally engage with the periphery of a traction wheel of the vehicle, spring actuated means tending to move said brake shoe into engagement with the wheel of the vehicle, other means associated with said spring-actuated means for rendering said spring actuated means ineffective to move the brake shoe into engagement with the wheel of the vehicle, and a flexible trailer carried by the brake shoe and adapted to space the traction wheel from a supporting surface when the brake shoe is in frictional engagement with the traction wheel.

2. In a brake construction for automotive vehicles, a pair of brake shoes each having one face thereof curved to conform to the contour of the periphery of a traction wheel of the vehicle, links swingingly supporting each brake shoe in adjacent relation to the periphery of one of the traction wheels of the vehicle, flexible connectors attached to the brake shoes and extending forwardly in underlying relation to the body of the vehicle, a shaft rotatably supported beneath the body of the vehicle adjacent to the forward end of the latter and having drums at the opposite ends thereof, said flexible connectors being wound upon said drums and secured at their forward ends to the latter, spring means connecting the flexible connectors with the body of the vehicle and exerting a tension on the flexible connectors tending to rotate said shaft in one direction and to cause the brake shoes to be swung into frictional engagement with the traction wheels, and means operable by the driver of the vehicle for holding said shaft against rotation in the said one direction.

3. In a brake construction for automotive vehicles, a pair of brake shoes each having one face thereof curved to conform to the contour of the periphery of a traction wheel of the vehicle, links swingingly supporting each brake shoe in adjacent relation to the periphery of one of the traction wheels of the vehicle, flexible connectors attached to the brake shoes and extending forwardly in underlying relation to the body of the vehicle, a shaft rotatably supported beneath the body of the vehicle adjacent to the forward end of the latter and having drums at the opposite ends thereof, said flexible connectors being wound upon said drums and secured at their forward ends to the latter, spring means connecting the flexible connectors with the body of the vehicle and exerting a tension on the flexible connectors tending to rotate said shaft in one direction and to cause the brake shoes to be swung into frictional engagement with the traction wheels, means operable by the driver of the vehicle for holding said shaft against rotation in the said one direction, and other means operable by the driver of the vehicle for rotating the shaft in the opposite direction.

4. In a brake construction for automotive vehicles, a pair of brake shoes each having one face thereof curved to conform to the contour of the periphery of a traction wheel of the vehicle, links swingingly supporting each brake shoe in adjacent relation to the periphery of one of the traction wheels of the vehicle, flexible connectors attached to the brake shoes and extending forwardly in underlying relation to the body of the vehicle, a shaft rotatably supported beneath the body of the vehicle adjacent to the forward end of the latter and having drums at the opposite ends thereof, said flexible connectors being wound upon said drums and secured at their forward ends to the latter, spring means connecting the flexible connectors with the body of the vehicle and exerting a tension on the flexible connectors tending to rotate said shaft in one direction and to cause the brake shoes to be swung into frictional engagement with the traction wheels, means operable by the driver of the vehicle for releasably holding the shaft against rotation in the said one direction.

5. In a brake construction for automotive vehicles, a pair of brake shoes each having one face thereof curved to conform to the contour of the periphery of a traction wheel of the vehicle, links swingingly supporting each brake shoe in adjacent relation to the periphery of one of the traction wheels of the vehicle, flexible connectors attached to the brake shoes and extending forwardly in underlying relation to the body of the vehicle, a shaft rotatably supported beneath the body of the vehicle adjacent to the forward end of the latter and having drums at the opposite ends thereof, said flexible connectors being wound upon said drums and secured at their forward ends to the latter, spring means connecting the flexible connectors with the body of the vehicle and exerting a tension on the flexible connectors tending to rotate said shaft in one direction and to cause the brake shoes to be swung into frictional engagement with the traction wheels, means operable by the driver of the vehicle for releasably holding the shaft against rotation in the said one direction, and guide means carried by the vehicle body for supporting the flexible connectors intermediate the ends of the latter.

6. In a brake construction for automotive vehicles, a pair of brake shoes each having one face thereof curved to conform to the contour of the periphery of a traction wheel of the vehicle, links swingingly supporting each brake shoe in adjacent relation to the periphery of one of the traction wheels of the vehicle, flexible connectors attached to the brake shoes and extending forwardly in underlying relation to the body of the vehicle, a shaft rotatably supported beneath the body of the vehicle adjacent to the forward end of the latter and having drums at the opposite ends thereof, said flexible connectors being wound upon said drums and secured at their forward ends to the latter, spring means connecting the flexible connectors with the body of the vehicle and exerting a tension on the flexible connectors tending to rotate said shaft in one direction and to cause the brake shoes to be swung into frictional engagement with the traction wheels, means operable by the driver of the vehicle for releasably holding the shaft against rotation in the said one direction, guide means carried by the vehicle body for supporting the flexible connectors intermediate the ends of the latter, and stops on said flexible connectors for engaging said guide means to limit the movement of said connectors when actuated by said springs.

7. In a vehicle, a brake shoe adapted for frictional engagement with the outer periphery of a ground wheel which is included in the vehicle, a pair of elongated members pivotally attached at their lower ends to opposite sides of said brake shoe, said elongated members having slots therein extending longitudinally thereof, bolts carried by a fixed part of the vehicle and in sliding engagement with said slots whereby the brake shoe will be swingingly supported from movement to and from position to engage said wheel, said bolts having relatively wide heads and one of said elongated members having an opening therethrough at one side of the slot therein, said opening being adapted to receive the shackle of a padlock for engaging with the head of one of the bolts whereby the brake shoe will be releasably held against movement out of engagement with said wheel.

8. In a vehicle, a brake shoe swingingly supported for movement to and from position to frictionally engage the outer periphery of a ground wheel of the vehicle, fastening elements on the inner and outer sides of said brake shoe, and a flexible member adapted to be passed transversely of the inner periphery of the felloe of the wheel and secured at its ends to the fastening elements on the brake shoe, whereby the latter will be held against movement from a position in which it is engaged with the outer periphery of the wheel.

HENRY PERKINS SIDELINGER.